United States Patent
Kopra et al.

(10) Patent No.: US 7,403,769 B2
(45) Date of Patent: Jul. 22, 2008

(54) SYSTEM AND METHOD FOR MUSIC SYNCHRONIZATION IN A MOBILE DEVICE

(75) Inventors: Toni Kopra, Vantaa (FI); Mikko Mäkipää, Helsinki (FI); Sami Ronkainen, Oulu (FI)

(73) Assignee: Nokia Corporation, Espoo (FI)

( * ) Notice: Subject to any disclaimer, the term of this patent is extended or adjusted under 35 U.S.C. 154(b) by 778 days.

(21) Appl. No.: 10/806,704

(22) Filed: Mar. 23, 2004

(65) Prior Publication Data
US 2005/0216855 A1 Sep. 29, 2005

(51) Int. Cl.
*H04Q 7/20* (2006.01)
(52) U.S. Cl. .............. 455/414.1; 455/3.06; 455/566; 455/569.2
(58) Field of Classification Search .......... 455/556.1, 455/557, 559, 414.1, 414.4, 419, 420, 345, 455/3.01, 3.03, 3.05, 3.06, 566, 569.1, 569.2, 455/575.2; 705/57; 709/219, 232, 221, 231, 709/236; 369/47.01, 24.01; 381/86; 380/201
See application file for complete search history.

(56) References Cited

U.S. PATENT DOCUMENTS

| | | | |
|---|---|---|---|
| 6,023,241 A | 2/2000 | Clapper | 342/357.13 |
| 6,769,028 B1 | 7/2004 | Sass et al. | 709/231 |
| 6,937,732 B2 * | 8/2005 | Ohmura et al. | 381/86 |
| 2001/0034714 A1 * | 10/2001 | Terao et al. | 705/57 |
| 2001/0039873 A1 * | 11/2001 | Yi et al. | 84/610 |
| 2003/0079038 A1 | 4/2003 | Robbin et al. | 709/232 |
| 2004/0214525 A1 * | 10/2004 | Ahn et al. | 455/41.2 |

FOREIGN PATENT DOCUMENTS

| | | |
|---|---|---|
| EP | 1 531 403 A2 | 5/2005 |
| WO | WO 03/036541 A1 | 5/2003 |
| WO | WO-2004/023487 A1 | 3/2004 |

* cited by examiner

*Primary Examiner*—Jean Gelin
(74) *Attorney, Agent, or Firm*—Harrington & Smith, PC

(57) ABSTRACT

A computer program embodied in a computer readable medium in a mobile station MS includes instructions to display a first identifier, such as a song title, associated with a first media (music or video) file and a second identifier identified with a second media file. The first identifier indicates that the first media file is stored in the MS and the second identifier indicates that the file is not stored within the MS. Five such identifiers are disclosed, with functionality to up/download the media files one or more at a time from a PC or a networked server. Playlists and albums may be similarly indicated in their identifiers. The user is enabled to create and edit playlists on the MS without regard to what media files are stored on the MS. The MS may store file identifiers for the database maintained on the PC, a large-scale database maintained at a media service server, or a portion thereof. A mobile station is also described.

37 Claims, 6 Drawing Sheets

SYSTEM AND METHOD FOR MUSIC SYNCHRONIZATION IN A MOBILE DEVICE

FIELD OF THE INVENTION

The present invention relates to synchronizing and managing files that are stored in one or both of a memory-limited device such as a mobile station and a larger-memory device such as a personal computer. It is specifically directed toward software to manage music files between a portable and a non-portable device.

BACKGROUND

The owners of popular music have only recently embraced downloading digital copies of their copyrighted works over electronic networks such as the internet. One popular website for doing so is http://www.apple.com/itunes/, wherein users visit the website of a music service via a personal computer (PC) or the like, manually select a song title, and download a digital version of the selected song to the PC they used to visit the website. The user then plays the songs on the PC or transfers or uploads them to a portable device such as a Rio®, iPod® or other such dedicated portable digital music player.

Dedicated portable digital music players now have the capacity to store ten thousand or more digital song files and indexing information about those songs. While users can carry essentially their entire digital song collection with them and create and edit playlists on the go, the resulting playlists are limited to only those songs stored on the dedicated portable device; such dedicated devices do not have the capability to download songs directly from the music service. That function remains with the PC or similar device having a network connection. A portable device having such a network download capability, such as a mobile stations MS having an internet browsing capability, cannot currently dedicate enough of its limited memory only to storing and indexing many thousands of songs (though technological advances may soon overcome that limitation).

Furthermore, synchronization software for at least some popular dedicated portable music devices (such as iPod® and Nomad®) delete song files from one device (e.g., the dedicated portable device) upon being synchronized with a companion device (e.g., the Mac PC) from which the song file was deleted. In other words, deleting a song file from either device leads to deleting all remaining copies of the song on either device during the next synchronization, despite the fact that the user already purchased the song. In that instance, the PC cannot serve as a viable library from which to re-upload songs to the portable device. To the inventors' knowledge, the synchronization software does not prompt a user that the only remaining copy of a particular song file is about to be deleted, and therefore constricts the user's library of song files insidiously. Each of these aspects further drives the user to maintain his/her entire library of digital music files on a portable device; the PC being used only to download songs and possibly to create and edit playlists, but not as a music file repository.

Where a mobile station is used to store and play music, the user gains the advantage of downloading new songs on the go, but loses the advantage of having his/her entire music collection with him/her. In that instance, the user must dedicate more effort to managing the songs uploaded to and stored on the MS. Specifically, the user must select the music he intends to hear over the MS, create and/or edit playlists, delete unwanted songs from the MS, and upload from the PC to the MS any songs within the new playlists (and the new playlists themselves) that are not already stored in the MS. Generally, when a user wishes to upload songs to a MS, he/she creates new playlists or selects new songs on the PC, and all songs on the MS are automatically deleted and the newly selected songs and playlists are uploaded when initiated by the user. This is so that the songs most recently selected by the user (at the PC) may be stored on the memory within the MS that remains available for music files. Synchronization software as described above would require a use to maintain a song on a playlist continuously once it was uploaded to the MS, else lose all copies of that song.

One alternative is for a user to carry two disparate devices: a MS for mobile telephony and downloading songs on the go from a music service; and a dedicated portable music player for storing and playing a larger variety of songs than would be available on the MS alone. This appears the dominant preference of consumers given the current state of available hardware and software.

The inventors surmise that neither of the above options are optimal for users who desire both personalized music and mobile telephony capability while on the go. The present invention is therefore directed at streamlining a user's ability to manage the songs and playlists stored on and played by a MS, while still retaining the advantages a MS offers in downloading new songs directly from a networked music service.

SUMMARY OF THE INVENTION

This invention is in one embodiment a computer program embodied on a computer readable medium within a host device, preferably a mobile station MS. The computer program includes a first set of computer instructions to display a plurality of identifiers, each associated with a digital media file. The identifiers may be a song title, artist or the like. A first identifier indicates that a first media file associated with that first identifier is stored within the host device. A second identifier indicates that a second media file associated with that second identifier is not stored within the host device. Preferably, there are five identifiers: one indicates the media file is stored in the host device; one indicates the media file is stored in a separate device that is occasionally coupled to then host device via a local link; one indicates the media file is marked for deletion in that separate device; one indicates the media file is stored in both the host device and the separate device; one indicates the media file is stored in neither the host or separate device but has been previously purchased by the user; and the last one indicates the media file has not been purchased by the user but is available over a broader, non-localized network. Preferably, the host device is a MS and the separate device is a PC.

In another embodiment, the invention is a computer program embodied on a computer readable medium within a host device, such as a MS or a PC. The computer program includes a first set of computer instructions to store, within the host device, a first media file and a first identifier associated with that first media file. It also includes a second set of computer instructions to store, within the host device, a second identifier associated with a second media file that is not stored within the host device. Further, it includes a third set of computer instructions to display both the first and the second identifiers regardless of whether the host device is coupled to a network. In this manner, the computer program is enabled to display a media file title or other identifier whether or not the host device has stored within it the media file associated with each displayed identifier.

In yet another embodiment, the present invention is a mobile station that has an internal storage media, a processor, and a display interface. The internal storage media stores a first plurality of media files and a second plurality of file names. All media files of a certain audio/visual type that are stored within the mobile station are within the first plurality; for instance, all music files, all still-image files, all video files. A media file is a digital file from which a humanly perceptible audio and/or video signal may be reconstructed. The processor maps each of the first plurality of media files to a file name of the second plurality. For each file name of the second plurality that is displayed (and any of them may be, separately or in combination), those mapped to a media file are displayed with a first characteristic, and those mapped to a media file are displayed with something other than the first characteristic. Preferably, some of the media files displayed with other than the first characteristic are mapped to a separate storage location apart from the mobile station, and those are displayed with a second characteristic that may differ from the first in font, color, shading or background, or an icon displayed adjacent to the file name.

The mobile station may further include means to link to the separate storage location over one of a wireless telephony link, a cable link, a wireless piconet link, and a wireless optical link. These means are known in the art. In this instance, the processor sends a request for an additional media file that is not within the first plurality. This additional media file corresponds to a file name displayed with the second characteristic and is selected by a user. The file name selected by the user may be stored in the internal storage media, and the processor sends the request for the additional media file upon a user command input that occurs at a later time, such as only upon a user command input or automatically upon the next establishment of a link (as above) between the mobile station and the separate storage location. The separate storage location may be a PC or a server on the internet or other network. Some file names may be mapped to the PC, and others mapped to the server. In that case, file names mapped to one of the server or PC are displayed with the second characteristic, and those mapped to the other of the PC or server are displayed with the third characteristic. When the mobile station receives a new file name, such as via an email, or a new media file, such as by synchronizing with a PC or downloading a new media file from a server, the processor updates the mapping and the display interface reflects the update.

Similar to file names, the internal storage media may store a third plurality of file names associated with a playlist name, and the display interface displays the playlist name according to the processor's mapping. The third plurality of file names may or may not have file names in common with the second plurality of file names. Where each file name of the playlist corresponds to a media file stored in the internal memory media, the playlist name is displayed with a third characteristic, which may or may not be the same as the first characteristic used in displaying file names. Where some but not all so correspond, the playlist name is displayed with a fourth characteristic; and where none so correspond, the playlist name is displayed with a fifth characteristic. Either the fourth or fifth characteristic used for the playlist name, preferably the fourth, may be the same as the second characteristic used for the file name. A user can select the playlist name, and receive from the separate storage location (which may be a PC or server) each media file for which the processor mapped to the separate storage location the file names associated with the playlist. Preferably, this is done in response to a command input that, as above, may be separated in time from the user selecting the playlist name.

These and other features, aspects, and advantages of embodiments of the present invention will become apparent with reference to the following description in conjunction with the accompanying drawings. It is to be understood, however, that the drawings are designed solely for the purposes of illustration and not as a definition of the limits of the invention.

DETAILED DESCRIPTION

The following terms are used in describing the invention and its embodiments. A mobile station MS is a handheld portable device that is capable of wirelessly accessing a non-localized network such as the internet via a mobile telephony network of base stations that are coupled to a publicly switched telephone network. A cellular phone, a PCS phone, and a personal digital assistant (PDA) with internet capability are examples of a MS. A personal computer PC is a computing device, larger than handheld size, which is capable of accessing the network. This access may be via a hardwire connection or a wireless local area network WLAN. Though in some instances a PC may have wireless mobile telephony capability via a WLAN and a web-phone using voice-over internet protocol, the PC is distinguished over a MS by its size and by its non-use of base stations to access the broader network, as base stations are traditionally understood in the context of mobile telephony. A desktop PC, a laptop or palmtop PC, or a web-TV are examples of a PC. In nearly all instances, a PC is distinguished by a QWERTY keyboard that is not present in the MS. A digital music file is an audio work reduced to digital form, such as a popular music song on a CD or downloaded from a network. An identifier associated with a digital media file is any means by which the file may be indexed and categorized, such as song title, artist, album/CD, genre, and the like. An embedded ISRC (International Standard Recording Code), UPC (universal product code) or EAN (European Product Number) may also be used to uniquely identify a specific recording or digital music or media file. A media file is a digital file from which a humanly perceptible audio and/or video signal may be reconstructed. A digital version of a popular music song (such as may be played on an iPod® or Rio® device) or music video are examples of media files.

Figure 1:
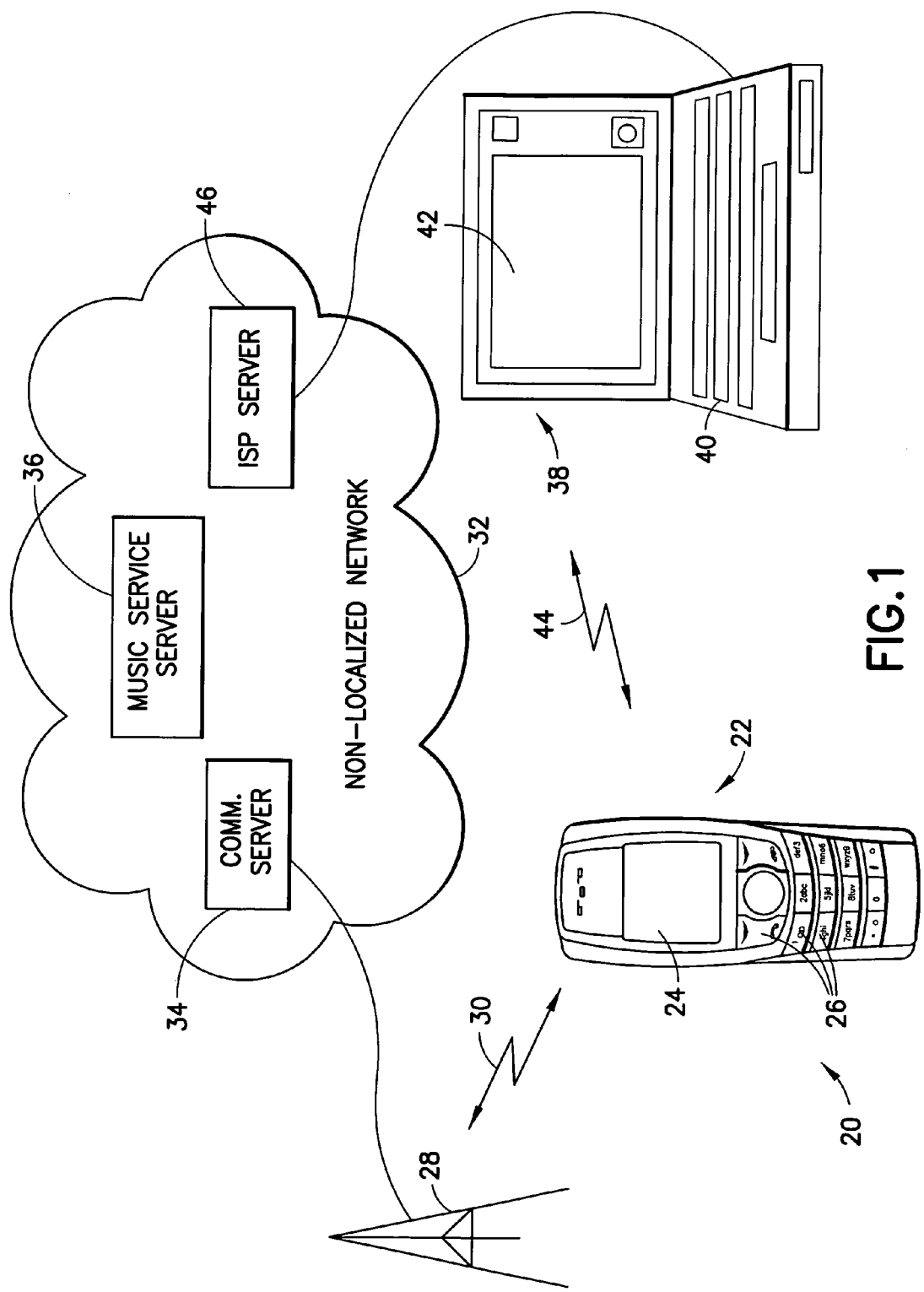
FIG. 1 is communication system in which the present invention is most advantageously operated.

FIG. 1 depicts a communication system 20 in which the present invention exhibits its greatest versatility. A MS 22 defines a user interface display 24 and a series of buttons 26 or other input means by which a user may make inputs to the MS. User inputs described herein as entered via buttons or the like may also be entered via voice commands where the MS 22 is so enabled. The MS 22 has mobile telephony capability through which it may place or receive wireless telephone calls through a base station 28 via a wireless telephony link 30. The base station 30 is coupled to a non-localized network 32 through preferably a hardwired connection (as shown) to a communication server 34 as is known in the art, through which the MS 22 may access a commercial provider of digital music files such as a server of a music service 36. Where the network 32 is the internet and the MS includes a compatible browser program, the MS 22 may download digital music files directly from the music service 36 via the mobile link 30.

Within the system is also advantageously a personal computer PC 38 having an input keyboard 40 such as a QWERTY type keyboard, and a display screen 42. The MS 22 and the PC 38 are in occasional communication via a local link 44, which may be a wireless Bluetooth® link, a hardwired cable connection that may couple to the MS 22 via a male/female plug arrangement or through a cradle, or the like. The local link 44 is short distance, generally limited to about fifty feet. The mobile telephony link 30 is viable over a much longer distance and differs from the local link 44 in both type and range. The PC 38 is in contact with the non-local network 32 via an internet service provider server 46 such as via a hardwire connection (as shown), or a WLAN connection where the WLAN includes an access point to the network 32.

As an overview, the present invention enables a user to manage identifiers for digital music files on the MS without regard to whether the associated music file underlying the identifier is stored on the MS 22. The underlying file may be stored on the PC 38 or only on the music service server 36. In this manner, the user may dynamically manage his/her library of music files on the go with the MS 22 by readily seeing on the display 24 of the MS 22 which music files are stored on the MS 22, which are stored on the PC 38, and which are stored only on the music service server 38. The user can create and edit playlists of song titles (or other identifiers) at the MS 22, and upload from the PC 38 via the local link 44 any or all music files listed on that new playlist that are not yet stored on the MS 22. Where the MS 22 stores lists of digital music titles stored in the music service server 36, the user may download from the music server 36 over the mobile telephony link 30 any or all music files listed on that new playlist that are not yet stored on the MS 22 or the PC 38. In this manner, the display 24 of the MS 22 enables the PC 38 to act as one database of digital music files already purchased by the user, and the music server 36 to act as another database of music files not yet purchased by the user. The titles or other identifiers of the underlying music files are displayed differently on the display 24 of the MS 22 based on the location of the underlying music file, such as by color coding the displayed title or displaying a particular icon adjacent to the title. Names of playlists (e.g., playlist 1; playlist 2; female vocalists; ski music) may also be differently displayed to indicate whether all underlying music files are within the MS 22, some within the PC 38, some within the music server 36, or none within the MS 22. Whereas the following detailed description refers to the display 24 on the MS 22, the invention applies equally to the display screen 42 of the PC 38.

Figure 2:
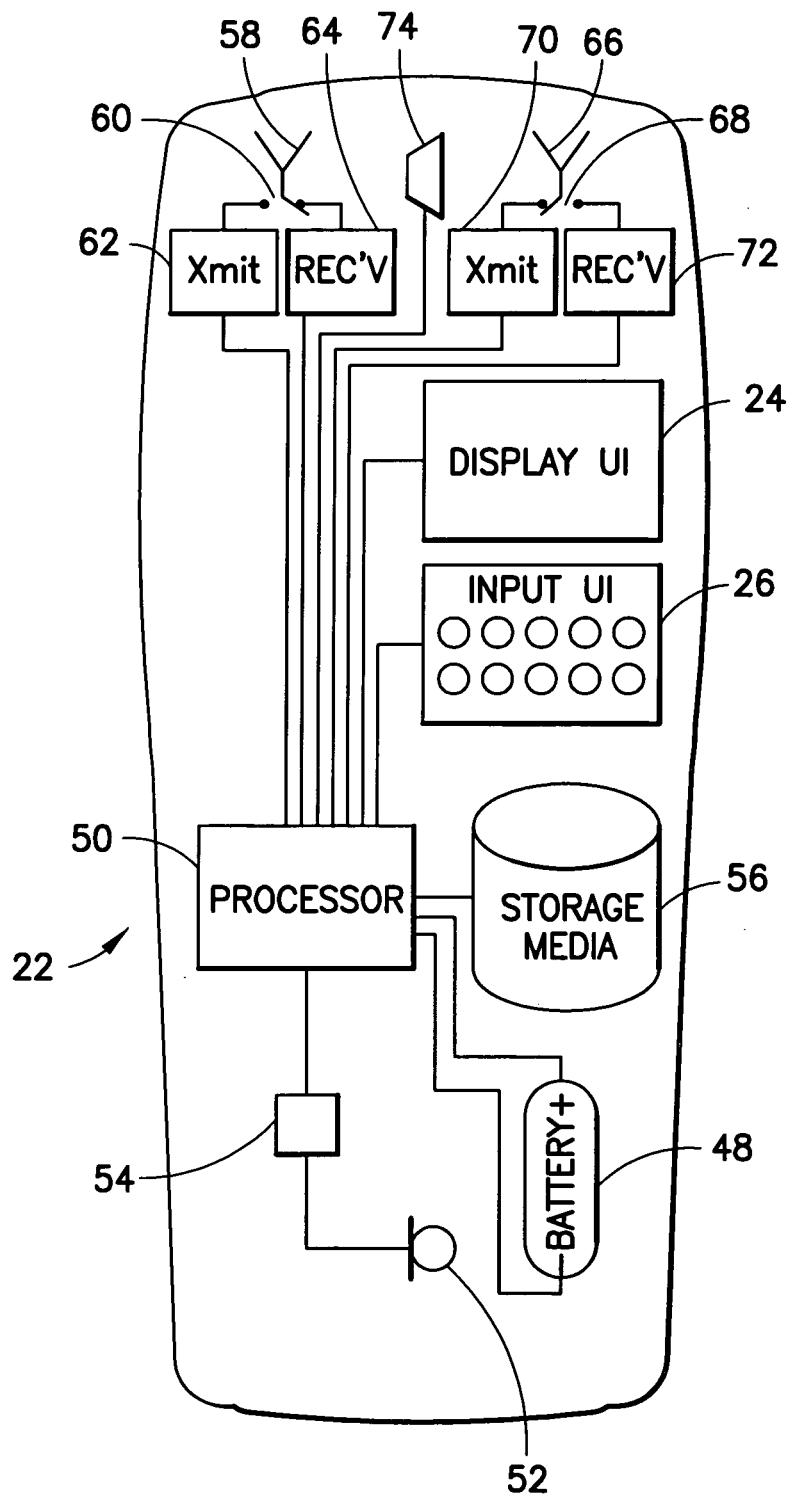
FIG. 2 is a mobile station in which the computer program of the present invention is stored.

FIG. 2 illustrates in block diagram form the MS 22 of FIG. 1. These blocks are functional and the functions described below may or may not be performed by a single physical entity as depicted in FIG. 2. The display 24 and user input means 26 are as previously described. The MS further includes a power source 48 such as a self-contained battery that provides electrical power to a processor 50 that controls functions within the MS 22. Voice inputs are received at a microphone 52 that may be coupled to the processor 50 through a buffer memory 54. Computer programs such as a display driver, modulating algorithms, encoding and decoding algorithms, and the like are stored in a memory storage media 56 which may be an electronic, optical, or magnetic memory storage media as is known in the art for storing computer readable instructions and programs. The MS 22 communicates over the mobile telephony link 30 via a first antenna 58 that is selectively coupled via a first T/R switch 60 to a primary transmitter 62 and a primary receiver 64. The MS 22 communicates over the local link 44 via a second antenna 66 that is selectively coupled via a second T/R switch to a Bluetooth® transmitter 70 and a Bluetooth® receiver 72. The primary antenna 58 may be more than one for multi-channel communications, and may also serve as the functions for the second antenna 66. The Bluetooth® transmitter 70 and receiver 72 are preferably but need not be separate from the primary transmitter 62 and receiver 64. Audible output from the MS 22 is transduced at a speaker 74.

Figure 3:
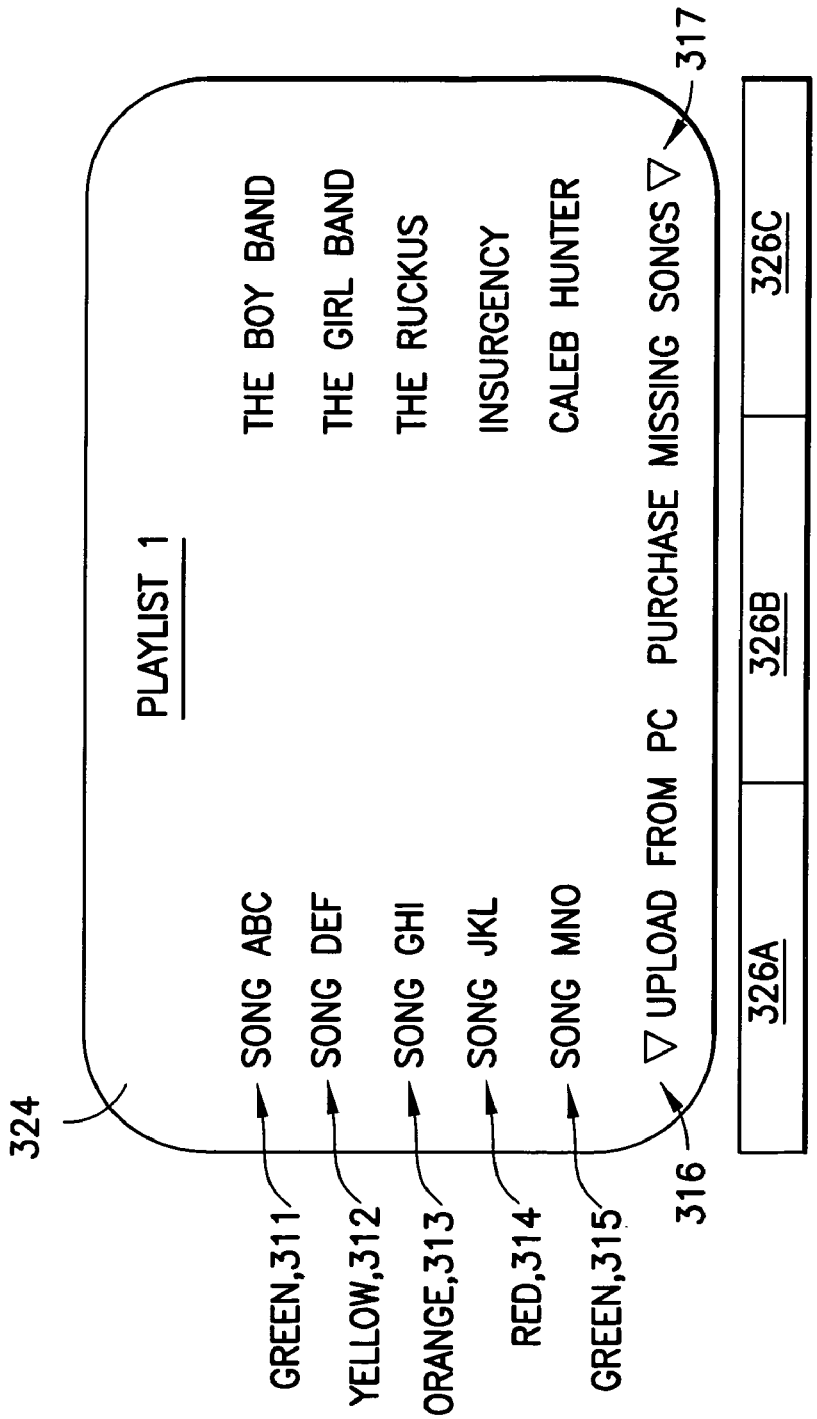
FIG. 3 is an exemplary display at the MS of a playlist of music file titles that identify where the underlying music file is stored.

Embodied on the computer readable storage media 56 is a computer program according to the present invention that carries one or more sets of computer instructions. A first set of computer instructions display a plurality of digital music file identifiers, each associated with an underlying digital music file. FIG. 3 depicts a display 324 of the MS 22 as may be directed by this first set of computer instructions: a playlist name 310 and a series of music file identifiers 311 through 315, each listing a song title and a song artist along a common horizontal line. The identifier(s) for the file "SONG ABC" is/are displayed so as to indicate that the music file associated with that identifier is stored in within the MS 22. The identifier(s) for the file "SONG DEF" is/are displayed so as to indicate that the music file associated with that identifier is stored in within the PC 38.

Preferably, the computer instructions provide five different indicators to show which of five categories each file identifier falls within. The indicators may be different colors for identifier text, different font for the text, icons adjacent to the text file identifiers, different backgrounds, and the like. A first category or indicator indicates that the underlying music file is stored within the MS 22, and is represented by lines 311 and 315 of FIG. 3. A second category or indicator indicates that the underlying music file is stored within the PC 38 but not within the MS 22, and is represented by line 314 of FIG. 3. A button 326A, preferably flagged by a soft function identifier 316, enables the user to upload a selected song of the second category, or all displayed songs of the second category, to the MS 22 from the PC 38. Depressing the button 326A causes the MS 22 to initiate a local connection 44 with the PC 38 and automatically upload the underlying music file associated with the category 2 identifier(s). Where an immediate local connection 44 cannot be established (e.g., out of range), the associated music file will be uploaded upon the next synchronization or connection with the PC 38. A third category or indicator indicates that the underlying music file is stored in both the MS 22 and PC 38. In this category, the music file may be deleted at the MS 22, in which case its identifier at the MS 22 shows that the music file at the PC 38 is marked for deletion, either on an immediately established link 44 or upon the next synchronization as with the category two identifiers and files. A fourth category or indicator indicates that the underlying music file has previously been purchased by the user but is no longer stored within either the PC 38 or the MS 22 (e.g., deletion, data loss, corrupted file), and may be re-downloaded from the music service server 36 where it is stored. A fifth category or indicator indicates that the underlying music file is stored within the music service server 36 but had not yet been purchased by the user. Depressing another button 326C flagged by a soft function indicator 317 initiates a wireless telephony link 30 to access the music service server 36 to download the music file associated with either the selected category four or five identifier, or to download multiple music files underlying multiple selected identifiers.

Indicators for any of these five categories may be displayed regardless of the presence of a link 30, 44 to other components, because the music file identifiers are stored within the MS 22. The user can see at a glance which music files are resident on the MS 22, which are resident on the PC 38, and which he/she has previously purchased and may yet download another copy within that original license. A file identifier may automatically transition from category four to category five upon expiration of a license upon which a copy of a music file is purchased, which, when present, are generally limited in time or number of downloads when present. Where lines 311 and 315 of FIG. 3 represent category one identifiers, only those music files will be played when the user selects "PLAYLIST 1" to play on the MS 22.

The MS 22 is enabled to display file identifiers for music files that are not stored within the MS 22 by storing identifiers separate from the music files with which they are associated. For example, upon synchronizing with the PC 38, all identifiers for the database of music files within the PC 38 are uploaded to the MS 22. A simple comparison between that uploaded identifier database and the database of music files within the MS 22 resolves category 1 and category 2 files. Category three files are self explanatory; the user may mark for deletion a music file associated with an identifier at the MS 22, whether or not the user ever had a copy of that same music file stored on the MS 22. Category four files have been previously deleted so that no associated music file exists on the MS 22 or the PC 38, but the deletion need not eliminate the associated identifier, leaving category four files. Category five files are stored on the music service server 36. Similar to uploading from the PC 38 the identifiers for music files stored there, the MS 22 may download from the music service server 36 a database of music file identifiers for which the server 36 stores an associated music file. This database downloaded from the server 36 may include all music files stored on the server 36, it may be tailored to the user's preferences either explicitly when the user explicitly selects a particular subset of music files for which he/she desires identifiers, the server 36 may deduce a user preference based on music files downloaded by that user, or the identifiers may be only those from the same artist or album/CD for which the user has browsed or downloaded already. Even a file carrying identifiers for about 500,000 music files will occupy about the same amount of storage media 56 as only several music files themselves, so this option is viable for currently available MSs 22. Regardless, the identifier database as well as the database of underlying music files is updated each time the MS 22 and PC synchronize, and each time the MS 22 and the server 36 communicate. As noted above, the same display and categories may be displayed on the display screen 42 of the PC 38 where the computer program described above is resident on the PC 38, with obvious modifications to the above description.

Figure 4:
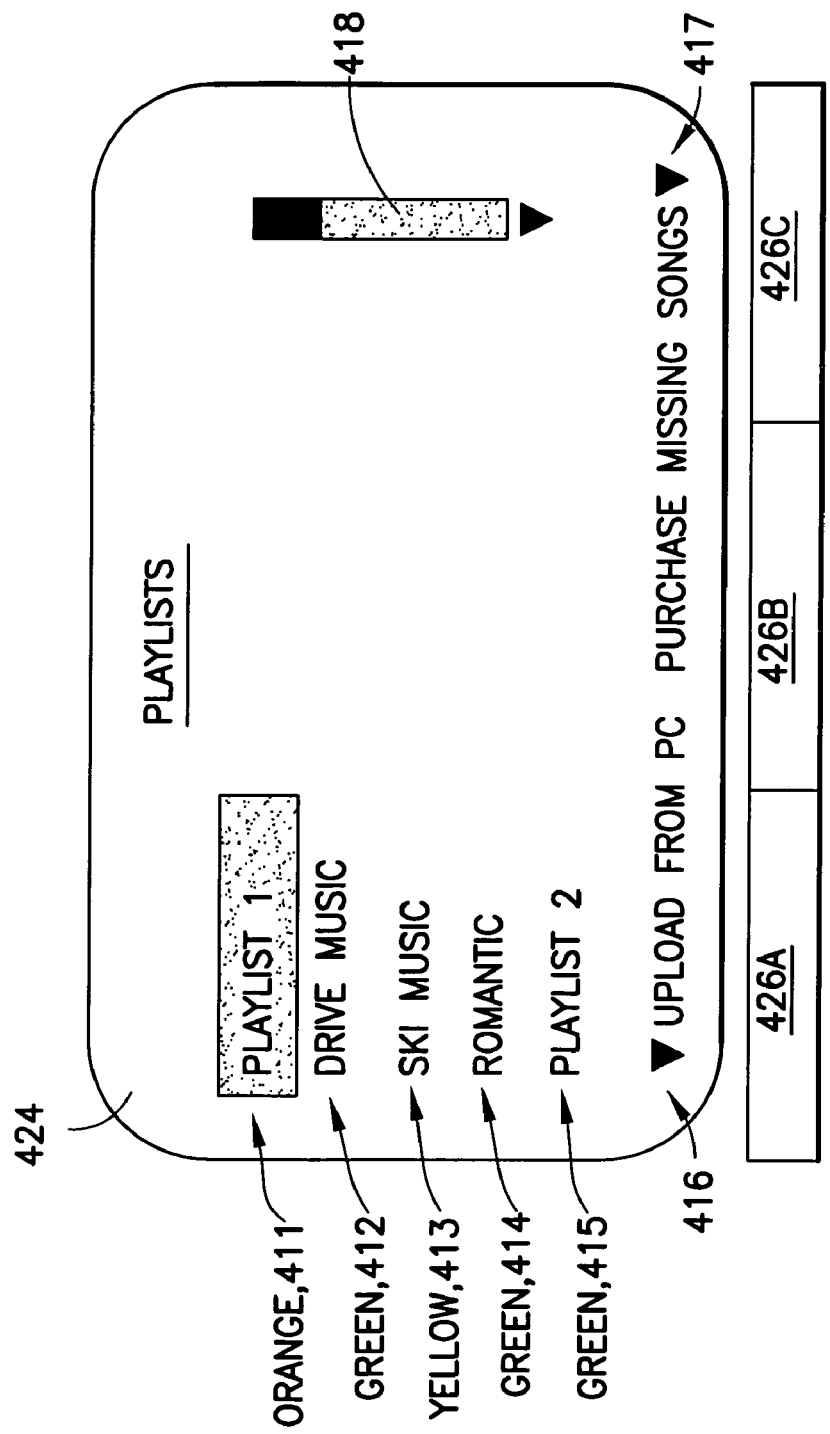
FIG. 4 is an exemplary display at the MS of a list of playlists wherein each playlist identifies where the music files underlying the titles within that playlist are stored.

The concept described above is extended in the present invention to playlists themselves as illustrated in FIG. 4, a display 424 of an MS 22 showing a list of playlists. Five playlist names are shown: "Playlist 1" at line 411; "Drive Music" at line 412; "Ski Music" at line 413; "Romantic" at line 414; and "Playlist 2" at line 415. "Playlist 1" includes, for example, music file identifiers for both category one and category two as shown in FIG. 3. Such a playlist name may be indicated by an orange color, for example. The particular shade of orange may further indicate the amount of underlying files on the MS 22 versus the PC 38 and/or server 36. "Drive Music" and "Romantic" may instead include only music identifiers for which the underlying music files are resident on the MS 22, so those playlist names may be indicated in green. "Ski Music" may for example include only identifiers whose underlying music files are resident only on the PC 38, so it may be indicated in yellow. "Playlist 2" may include only file identifiers whose underlying music files are stored only on the server 36 and not on the PC 38 or MS 22, and might be indicated by a red color. Where more playlists exist than can be simultaneously shown on the display 424, a scroll bar 418 may be added as known in the art.

Assume that "Playlist 1" includes some file identifiers for which the associated music file is resident on the MS 22, some file identifiers for which the associated music file is resident on the PC 38 but not the MS 22, and some file identifiers for which the associated music file is resident on the server 36 but not on the PC 38 or the MS 22. A user may select that playlist name, as indicated in FIG. 4 by a shaded background behind the playlist name. Depressing a single button 426A, as identified by a soft function indicator 416, will cause the MS 22 to initiate a local connection 44 to the PC 38 and upload all music files associated with the identifiers on that playlist from the PC 38, save those already stored in the MS 22 (alternatively, it may upload all such files, overwriting those already stored on the MS 22). Where no connection 44 is immediately available, the music files will be marked for upload on the next synchronization. Depressing another single button 426C, as identified by another soft function indicator 417, will cause the MS 22 to initiate a mobile telephony connection 30 to the music service server 36 and download all music files associated with the identifiers on that playlist from the server 36 that are marked as not stored in the PC 38 or MS 22. User billing data may be stored at the server 36 from a previous transaction to enable fewer keystrokes from the user to effect the transaction.

Figure 5:
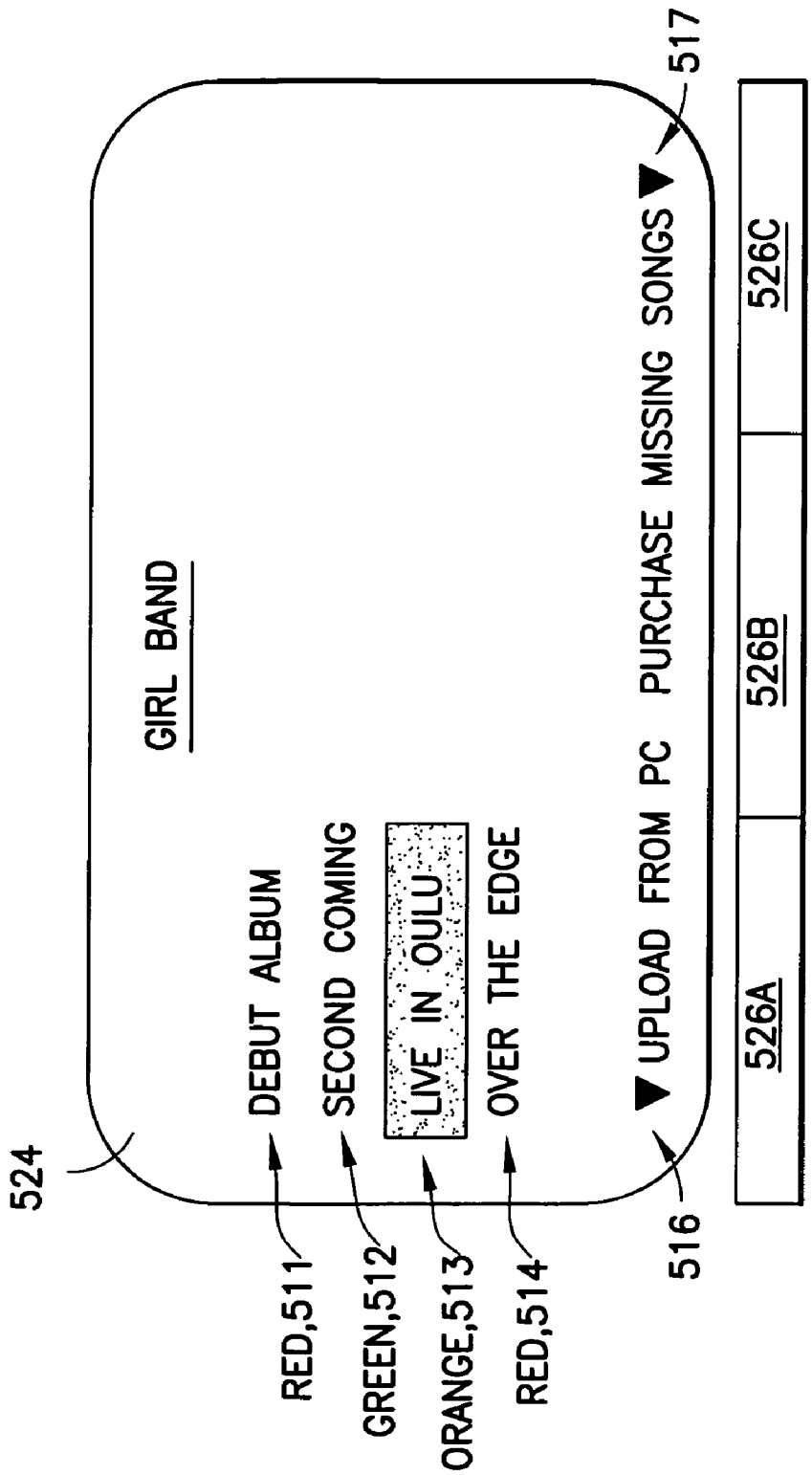
FIG. 5 is an exemplary display at the MS of a listing of CDs by one band, each CD identified by where the music files within that CD are stored.

Similar functionality may be used for a specific artist, as shown in FIG. 5. The artists name is displayed atop the display 524, along with a listing of album/CD names or other identifiers. These identifiers may be stored on the MS 22 as described above, even if no music file from that album/CD is stored on the MS 22. The album/CD name is displayed similar to the playlist names of FIG. 4: a red color indicates all music files or tracks from that album/CD is available on the server 36 but not stored on the MS 22 or PC 38; shades of orange indicate varying percentages of music files for that album/CD are stored on any mixture of the MS 22, PC 38 and server 36; yellow indicates that all music files for that album/CD are stored on the PC 38 but not the MS 22; and green indicates that all music files for that album/CD are stored on the MS 22. A user may highlight a particular album/CD as shown in line 513 for the album/CD identifier "Live in Oulu". Depressing a single button 526A, as identified by a soft function indicator 516, will cause the MS 22 to initiate a local connection 44 to the PC 38 and upload all music files associated with the selected album/CD name from the PC 38, save those already stored in the MS 22 (alternatively, it may upload all such files, overwriting those already stored on the MS 22). Where no connection 44 is immediately available, the music files will be marked for upload on the next synchronization. Depressing another single button 526C, as identified by another soft function indicator 517, will cause the MS 22 to initiate a mobile telephony connection 30 to the music service server 36 and download all music files associated with the selected album/CD identifier from the server 36 that are marked as not stored in the PC 38 or MS 22.

Figure 6:
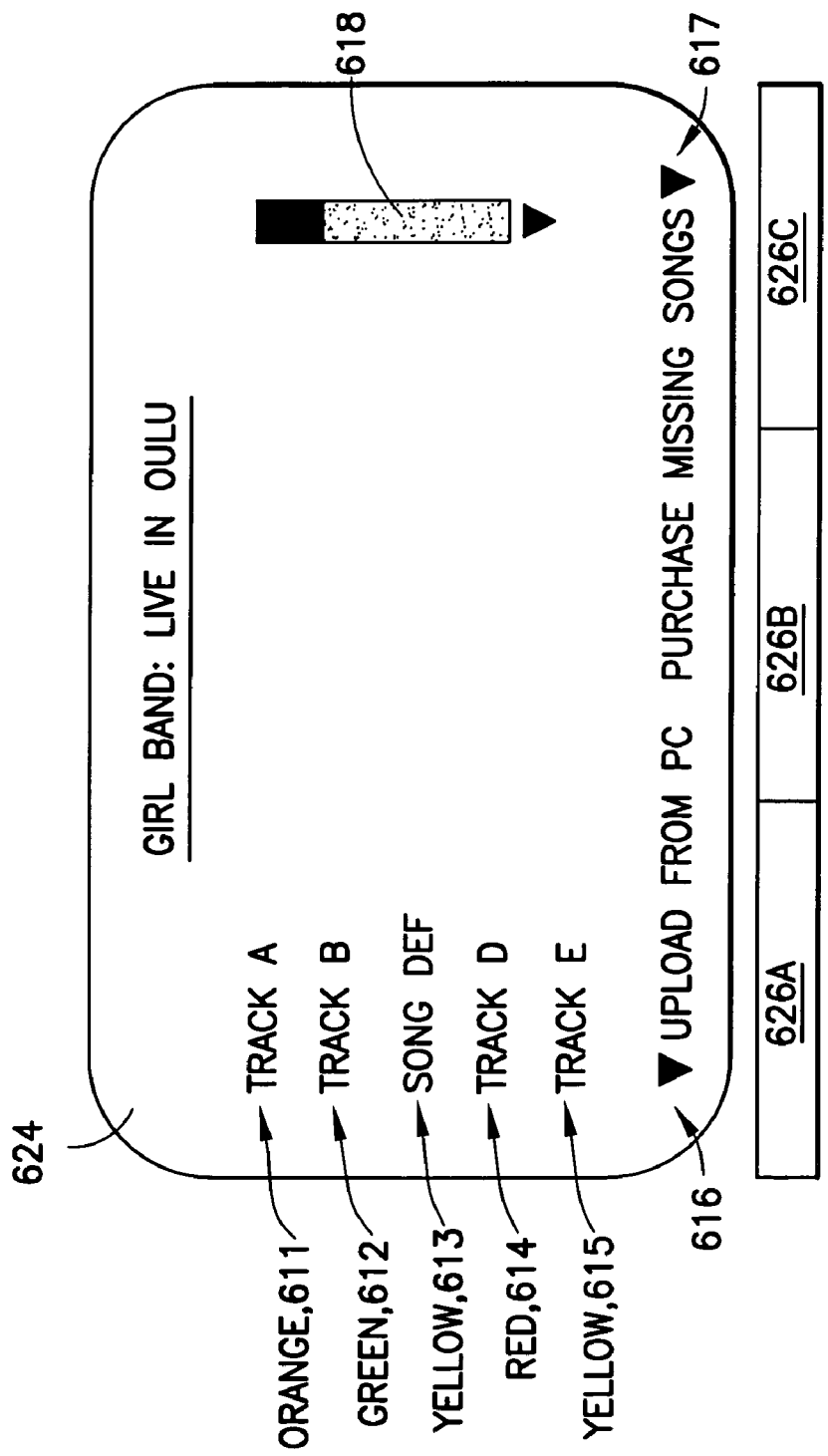
FIG. 6 is an exemplary display at the MS of a listing of one CD and its tracks, each track identified by where the underlying file is stored.

However, a user may not wish to always upload or download all remaining tracks of an album/CD as described in FIG. 5. In accordance with FIG. 6, a display 624 may yet list the music files associated with only one particular album/CD. Continuing with the "Live in Oulu" album/CD identifier of "The Girl Band" of FIG. 5, FIG. 6 lists all music files 611-615 from that album/CD (with scroll bar 618 where necessary). These music identifiers carry an indication of the category in which the underlying music file falls, as described with reference to the music files of the playlist in FIG. 3. Selecting only one of the file identifiers followed by a user input via a button 616, 617 then effects upload via a local link 44, or download via a wireless telephony link 30, as the case may be, of the associated music file.

The sets of computer instructions described above may be resident on the MS 22 as particularly described, or on the PC 38 with minor obvious modifications. Where a local link 44 cannot be established when first attempted, the computer program preferably marks the file identifier to perform the intended act (e.g., upload, delete) upon the next synchronization with the other device (PC 38 or MS 22). Where a mobile telephony link 30 cannot be established when first attempted, the computer program preferably marks the file identifier to perform the intended act (e.g., download) upon the next time the user accesses the server 36 via either the current device 22, 38, or the other device 38, 22 after synchronization with the current device but before the next accessing of the server 36.

In addition to enabling a user to better assess the state of his music library on both the MS 22 and the PC 38 with only a few glances at either display 24, 42, the present invention enables a user to create, edit, and delete playlists from his/her MS 22 so that playlists are dynamically updated over link 30, 44 based on changes entered while the user is on the go. For example, a friend may email or SMS the title of a new song that the friend recommends. The user can paste the emailed song title to a playlist and immediately see if he/she owns a copy of the music file for that song on either the MS 22 or PC 38.

Similar functionality may be achieved where the friend emails an entire playlist. Each title within the playlist is mapped to the underlying music file stored in the MS 22 and/or the PC 38, as appropriate. However, in the instance where there is no data connection between the MS 22 and the PC 38, certain titles in the playlist may not accurately indicate that an underlying corresponding file is stored in the other device (e.g., the PC 38 when the playlist is emailed to the MS 22). That inaccuracy would be corrected upon the next synchronization of the MS 22 and PC 38. In general, the enhanced user environment of the present invention allows users to dispense with carrying a dedicated portable music player and a MS, in favor of a MS using the programs of the present invention.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. For example, the MS may request a download from a network based server via the PC when the MS and the PC have an active link between them, such as a Bluetooth or a cable link. Where the MS may have options for two different links to the database, a selected song may be downloaded via the best available link (such as the one exhibiting the capacity for higher data transfer rate) so that a broadband cable to a PC links to the MS would be selected to download the media file over a mobile telephony link. Additionally, the MS may not establish a link for purposes of downloading a song whose title the user selected until and unless a certain prescribed data transfer rate is measured, so that the user request is not automatically complied with when only poor or low-throughput links are available. All such and similar modifications of the teachings of this invention will still fall within the scope of this invention. Furthermore, some of the features of the present invention could be used to advantage without the corresponding use of other features. As such, the foregoing description should be considered as merely illustrative of the principles of the present invention, and not in limitation thereof.

What is claimed is:

1. A computer readable storage media embodying a computer program, comprising:
    a first set of computer instructions to display at a mobile station MS a plurality of identifiers each associated with a digital media file, wherein
        a first identifier indicates that a first media file associated with the first identifier is stored within the MS, and
        a second identifier indicates that a second media file associated with the second identifier is not stored within the MS and is stored at a separate device other than the MS, regardless of whether the MS is in communication with the separate device.

2. The computer readable storage media of claim 1 wherein the identifier comprises a media file title and the first and second identifier are distinguished by at least one of: a different font of said title, a different color of said title, a different shade of said title, and a different icon displayed adjacent to the title.

3. The computer readable storage media of claim 1 further comprising:
    a second set of computer instructions to establish a connection to a database and copy the second media file to the MS in response to a user input.

4. The computer readable storage media of claim 3 wherein the database comprises a server on a network, and the connection from the mobile station to the server is via a personal computer to which the mobile station is electronically coupled.

5. The computer readable storage media of claim 3 wherein
    the second identifier indicates that a second media file associated with the second identifier is stored within a personal computer PC and is not stored within the MS, and
    the first set of computer instructions further display a third identifier that indicates that a third media file associated with the third identifier is not stored within the MS or the PC.

6. The computer readable storage media of claim 5 wherein
    the second set of computer instructions initiates a local connection to the PC to upload the second media file when the corresponding user input selects the second identifier, and initiates a mobile telephony connection to a media service server to download the third media file over a data communications network when user input selects the third identifier.

7. The computer readable storage media of claim 1 further comprising:
a third set of computer instructions to display a playlist name associated with a plurality of digital media identifiers, wherein
the playlist name is displayed in a first manner when all digital media files associated with the digital media identifiers associated with the first playlist name are stored within the MS;
the playlist name is displayed in a second manner when at least one but not all digital media files associated with the digital media identifiers associated with the first playlist name are stored within the MS; and
the playlist name is displayed in a third manner when no digital media files associated with the digital media identifiers associated with the first playlist name are stored within the MS.

8. The computer readable storage media of claim 7 wherein the third set of computer instructions simultaneously displays at least two playlist names, each in one of the first, second, and third manner, and does not simultaneously display a digital media identifier associated with either of the at least two playlists.

9. The computer readable storage media of claim 8 further comprising:
a fourth set of computer instructions responsive to a user both selecting a playlist that is displayed in the second or third manner, and requesting a new file be stored in the MS, to initiate a connection to a database and copy music files from that database that are associated with the digital media identifiers of the user selected playlist and not stored on the MS.

10. The computer readable storage media of claim 9 wherein
the database is stored within a personal computer PC and the connection comprises a local connection to the PC.

11. The computer readable storage media of claim 9 wherein
the database is stored within a media service server and the connection comprises a mobile telephony connection via the internet.

12. The computer readable storage media of claim 1 wherein
the second identifier indicates that the second media file associated with the second identifier is stored within a personal computer PC that has previously been synchronized to the MS.

13. The computer readable storage media of claim 12 wherein the plurality of identifiers include
a third identifier that indicates that a third media file associated with a third identifier is stored in both the MS and within a personal computer PC that has been coupled to the MS via a local link.

14. The computer readable storage media of claim 13 wherein the plurality of identifiers include
a fourth identifier that indicates that a fourth media file associated with a fourth identifier is not stored in the MS or in a device separate from the MS and linked thereto via a local link, and is stored in a server linked to the MS via a mobile telephony link.

15. A computer readable storage media embodying a computer program, comprising:
a first set of computer instructions to store, within a portable host device, a first media file and a first identifier associated with said first media file;
a second set of computer instructions to store, within the host device, a second identifier associated with a second media file that is stored in a separate device and that is not stored within the host device;
a third set of computer instructions to display both the first and second identifier at the host device regardless of whether the host device is in communication with the separate device.

16. The computer readable storage media of claim 15 further comprising:
a fourth set of computer instructions to enable a user to create and edit a playlist of media identifiers stored within the host device without regard to whether a media file associated with a particular music identifier is stored within the host device.

17. The computer readable storage media of claim 16 further comprising a fifth set of computer instructions to synchronize music files and playlists between the host device and the separate device, wherein the separate device comprises a personal computer, wherein a media file deleted from the host device is not automatically deleted from a separate device selectively coupled to the host device via a local link.

18. The computer readable storage media of claim 15 wherein the second set of computer instructions is to upload, over a local connection from the separate device, and store a database of identifiers each associated with a media file that is stored in the separate device.

19. The computer readable storage media of claim 18 wherein the separate device is a personal computer PC.

20. The computer readable storage media of claim 15 wherein the second set of computer instructions is to download, over a mobile telephony connection and the internet from a media service server, and store a database of identifiers each associated with a media file that is stored at the separate device, wherein the separate device comprises the server.

21. The computer readable storage media of claim 20 wherein the database of identifiers is a subset of all identifiers stored at said server, said subset defined by at least one user preference.

22. The computer readable storage media of claim 15 wherein the host device is a mobile station.

23. A portable device comprising:
an internal storage media to store a first plurality of media files and a second plurality of file names;
a processor coupled to the internal storage media to map each of the first plurality of media files to a file name; and
a display interface coupled to the processor to display a series of file names, such that each file name that is mapped to a media file of the first plurality is displayed with a first characteristic and each file name that is not mapped to a media file of the first plurality is displayed with other than the first characteristic,
wherein said processor is further to map at least one file name, that is not mapped to one of the first plurality of media files, to a separate storage location apart from the mobile station; and
said display interface is further to display each file name that is mapped to the separate storage location with a second characteristic.

24. The portable device of claim 23 further comprising:
means to link to the separate storage location over one of a wireless telephony link, a cable link, a wireless piconet link, a wireless LAN, and a wireless optical link, wherein said processor sends a request for an additional media file that is not within the first plurality, wherein the additional media file corresponds to a file name displayed with the second characteristic and is selected by a user.

25. The portable device of claim 24 wherein said file name selected by a user is stored in the internal storage media, and the processor sends the request for the additional media file upon a user command input.

26. The portable device of claim 24 wherein, in response to a user command input, the processor sends the request upon a next subsequent establishment of a communication link when a communication link is not established upon the user command input.

27. The portable device of claim 26 wherein the next subsequent establishment of the link is established automatically when the mobile station determines a prospective link meets a minimum data exchange rate.

28. The portable device of claim 24 wherein the portable device further comprises means to link over at least two of said links, and the processor selects one of said at least two links to establish based on a comparison of data throughput over the links.

29. The portable device of claim 23 wherein said display interface is further to display, for each file name that is not mapped to either of the internal storage media or the separate storage location, with a third characteristic.

30. The portable device of claim 23 wherein the first and second characteristics differ in at least one of font, color, shade, background, and icon displayed adjacent to the file name.

31. The portable device of claim 23 further comprising a receiver to receive one of an additional file name over a wireless link, said processor further to update said mapping to reflect the additional file name and said display interface to display said additional file name with one of the first characteristic and the other than the first characteristic, consistent with the processor mapping.

32. The portable device of claim 31 wherein said additional file name is within a playlist of additional file names received over the wireless link, said processor to update for each file name within the playlist and said display interface to display each file name within the playlist with one of the first characteristic and the other than the first characteristic, consistent with the processor mapping.

33. The portable device of claim 23 wherein said internal storage media is further to store a playlist name associated with a third plurality of file names, and said display interface is further to display said playlist name with:
 a third characteristic when each file name of the third plurality is mapped by the processor to a media file of the first plurality;
 a fourth characteristic when some but not all of the file names of the third plurality are mapped by the processor to a media file of the first plurality; and
 a fifth characteristic when none of the file names of the third plurality are mapped by the processor to a media file of the first plurality;
 and where in at least one first condition the first and third characteristics are identical, and where in at least one second condition one the fourth characteristic or the fifth characteristic is identical to the second characteristic.

34. The portable device of claim 33 wherein said display interface displays said playlist name with the fourth characteristic when some but not all of the file names of the third plurality are mapped by the processor to a media file of the first plurality and some but not all of the file names of the third plurality are mapped by the processor to a storage location separate from the mobile station.

35. The portable device of claim 34 further comprising
 means to link to the separate storage location over one of a wireless telephony link, a cable link, a wireless piconet link, a wireless LAN, and a wireless optical link,
 wherein said processor sends, in response to a command input and a user selection of the playlist name, a request for each media file for which the processor mapped the file name of the third plurality to the separate storage location.

36. A portable device comprising:
 storage means for storing a first plurality of media files and a second plurality of file names;
 processing means coupled to the storage means for mapping each of the first plurality of media files to a file name; and
 display means coupled to the processing means for displaying a series of file names, such that each file name that is mapped to a media file of the first plurality is displayed with a first characteristic and each file name that is not mapped to a media file of the first plurality is displayed with other than the first characteristic,
 wherein said processing means is further for mapping at least one file name, that is not mapped to one of the first plurality of media files, to a separate storage location apart from the portable device; and
 said display means is further for displaying each file name that is mapped to the separate storage location with a second characteristic.

37. A method comprising:
 locally storing a first plurality of media files and a second plurality of file names;
 mapping each of the first plurality of media files to a file name;
 mapping at least one file name, that is not mapped to one of the first plurality of media files, to a separate storage location apart from the portable device; and
 displaying a series of file names, such that each file name that is mapped to a media file of the first plurality is displayed with a first characteristic and each file name that is mapped to the separate storage location is displayed with a second characteristic.

* * * * *